United States Patent Office 3,359,287
Patented Dec. 19, 1967

3,359,287
16-METHYLENE-17α-HYDROXY PROGESTERONES AND DERIVATIVES THEREOF
John C. Babcock and J. Allan Campbell, Kalamazoo Township, Kalamazoo County, Mich., assignors to The Upjohn Company, Kalamazoo, Mich., a corporation of Delaware
No Drawing. Filed Nov. 16, 1959, Ser. No. 852,981
15 Claims. (Cl. 260—397.4)

This invention relates to novel 16-methylene-17α-hydroxyprogesterones, 17-esters thereof, intermediates in the production thereof, and to a process for the production thereof, which compounds and process can be represented by the following formulae:

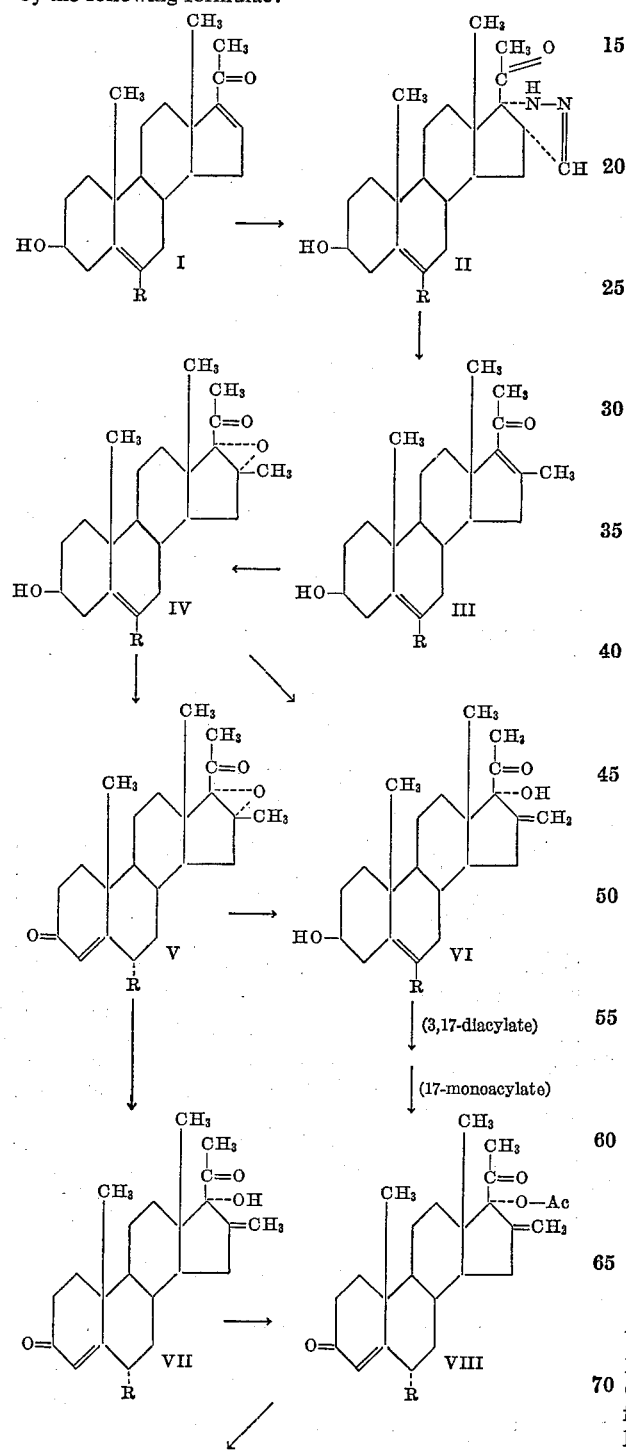

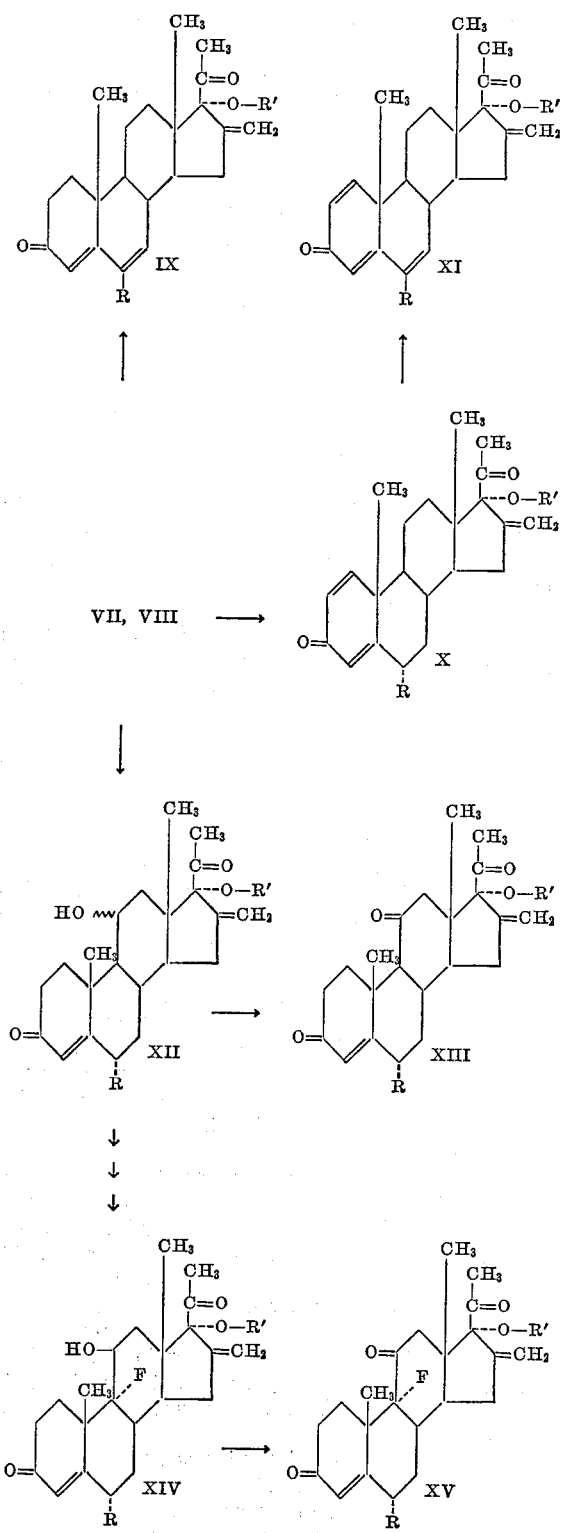

wherein R is hydrogen or lower-alkyl, e.g., methyl, ethyl, propyl, isopropyl, butyl, amyl, octyl, Ac is the acyl radical of a hydrocarbon carboxylic acid, preferably containing from one to twelve carbons atoms, inclusive, and R' is hydrogen or Ac as defined above.

According to this invention, 16-dehydropregnenolone or 6-lower-alkyl-16-dehydropregnenolone (U.S. 2,871,246) (I) is reacted with diazomethane to produce the corresponding diazomethane adduct (II). For convenience in structural representation, the double bond in the adduct portion of the molecule is represented as being between a carbon and a nitrogen atom. However, the double bond may be elsewhere in the ring and it is to be understood that II is intended to represent the reaction product of a pregnadienolone (I) and diazomethane. Heating decomposes the thus produced diazomethane adduct to produce a 16-methyl-16-dehydropregnenolone (III) Selective epoxidation of the $\Delta^{16}$-double bond, e.g., with hydrogen peroxide in the presence of alkali-metal hydroxide, produces a 6α,17α-epoxy-16β-methylpregnenolone (IV). Oxidation of the 3β-hydroxy group of these compounds by an Oppenauer oxidation produces the corresponding 16α,17α - epoxy - 16β - methylprogesterone (V) which, when reacted with anhydrous mineral acid, is converted to a 16-methylene-17α-hydroxyprogesterone (VII) of this invention. The 17-hydroxy-group can then be esterified, e.g., with an acid anhydride in an organic acid and an organic acid catalyst, preferably followed by a mild saponification with an alkali-metal hydroxide in an aqueous alkanol or sometimes preferably with mild acid to remove any 3-enol ester formed and regenerate the 3-keto group, to produce a 16-methylene-17α-hydroxyprogesterone 17-acylate (VIII) of this invention.

Alternatively, and preferably when R is lower-alkyl, the 16α,17α-epoxy-16β-methyl compound (IV) can first be reacted with anhydrous mineral acid to produce a 16-methylene-17α-hydroxypregnenolone (VI). This compound is then diesterified, e.g., with an acid anhydride in an organic acid catalyst with a strong organic acid such as p-toluenesulfonic acid, to produce the corresponding 3,17-diacetate (VIa). Selective hydrolysis, e.g., with aqueous mineral acid or alkali-metal hydroxide in methanolic aqueous alkanol under mild conditions, produces the corresponding 17-mono acylate (VIb). This compound is then oxidized by an Oppenauer oxidation to produce the corresponding 16-methylene-17α-hydroxyprogesterone 17-acylate (VIII).

The 16-methylene-17α-hydroxyprogesterones (VII) and 16 - methylene - 17α - hydroxyprogesterone 17 - acylates (VIII) of this invention are converted to the unsaturated derivatives thereof of this invention by reaction with chloranil to produce the corresponding $\Delta^{4,6}$-compounds (IX), or with selenium dioxide to produce the corresponding $\Delta^{1,4}$-compounds (X). The $\Delta^{1,4,6}$-compounds of this invention (XI) can be prepared by dehydrogenating the corresponding $\Delta^{4,6}$-compounds (IX) with selenium dioxide or preferably by dehydrogenating the corresponding $\Delta^{1,4}$-compounds (X) with chloranil.

The 16-methylene-17α-hydroxyprogesterones and 16-methylene-17α-acyloxyprogesterones of this invention (VII-XI) possess pharmacological activity including progestational, anti-inflammatory, glucocorticoid, and CNS-regulating. The unique combination of activities renders these compounds particularly useful in the treatment of conditions where both progestational and anti-inflammatory activity is desired. The favorable ratio of desired activity to side-effects, e.g., thymic involution and ACTH inhibition, also enhances the usefulness of these compounds.

The compounds of this invention can be administered to the animal organism, including mammals, in the usual fashion, e.g., topically, orally or parenterally. For this purpose they can be incorporated in pharmaceutical solutions or suspensions, e.g., aqueous solutions or suspensions for oral or parenteral use, in lotions, ointments, powder, pill or capsule form or oral use.

The novel 16-methylene-17α-hydroxy and 16-methylene-17α-acyloxy compounds represented by Formulae VII and VIII are also useful as intermediates in the production of the corresponding 11-oxygenated compounds (XII–XV). For example, a compound represented by Formula VII or VIII can be 11β- or 11α-hydroxylated with one of the many species of fungi known to oxygenate in that position, e.g., one from the order of Mucorales, Aspergillus, Penicillium, for example, *Rhizopus nigricans*, or *Curvularea lunata, Cunninghamella blakesleeana*, to produce a compound represented by Formula XII. Often fungi will remove an ester group. Thus R' in the reaction product can be H. If the ester group has been removed in the oxygenation process, it can be replaced in exactly the manner described in Example 2. A compound represented by Formula XII can be converted to the corresponding 11-keto compound (XIII) by oxidation, e.g., with chromic acid, chromic anhydride or N-bromoacetamide in pyridine, according to the usual procedures. Alternatively, the 11-hydroxy group can be converted to the 9α-fluoro-11β-hydroxy group (XIV) by the well known series of reactions involving the dehydration of the 11-hydroxy group, e.g., with N-bromoacetamide and anhydrous sulfur dioxide in pyridine or via the p-toluenesulfonate ester, to produce the corresponding $\Delta^{9(11)}$-compound which is then reacted with a hypohalous acid, e.g., N-bromoacetamide, N-chlorosuccinimide or N-iodosuccinimide, in the presence of aqueous perchloric acid, to produce the corresponding 9α-halo-11β-hydroxy compound which is then reacted with base, e.g., potassium acetate in acetone or sodium or potassium hydroxide in methanol, to produce the corresponding 9β,11β-oxide. Reaction of one of these oxides with anhydrous or aqueous hydrogen fluoride at below room temperature in the usual manner produces a 9α-fluoro-11β-hydroxy compound (XIV) which can be oxidized with chromic acid or chromic anhydride to produce the corresponding 11-keto compound (XV). Compounds XII–XV also possess pharmacological activity, including progestational, anti-inflammatory and glucocorticoid activity, of the same character although of a different order and spectrum than the compounds of VII-XI of this invention. They can be administered in the same manner and forms as described hereinbefore for compounds VII-XI.

The following preparations and examples are illustrative of the process and products of the present invention, but are not to be construed as limiting.

PREPARATION 1

*16(17)-diazomethane adduct of 6-methyl-16-dehydropregnenolone (II)*

To a two phase solution of 60 ml. of 50% potassium hydroxide and 200 ml. of ether was slowly added, with stirring and cooling in an ice bath, 22 g. of N-methyl-N-nitroso-N'-nitroguanidine. The resulting ether solution of diazomethane was decanted and 8.0 g. of 6-methyl-16-dehydropregnenolone (U.S. 2,871,246) was added. The mixture was maintained at room temperature overnight and the excess diazomethane was decomposed with acetic acid and the solution was washed twice with water, dried over magnesium sulfate, filtered and then concentrated to dryness. The partly crystalline residue was triturated with acetone, filtered and dried to give 5.5 g. of the 16(17)-diazomethane adduct of 6-methyl-16-dehydropregnenolone, e.g., 6β - acetyl - 1,2,3,4,4a,4b,5,6,6a,5β,7,9a,10,10a,10b,11-hexahydro - 4a,6a,12 - trimethylnaphth[2',1' - 4,5] indano-[1,2-c]pyrazol-2-ol. Recrystallization of 0.5 g. of this product gives 0.3 g. melting at 180–184° C. (with evolution of gas), $[\alpha]_D +21°$ (CHCl$_3$). Infrared spectrum analysis indicated that the double bond was a C–N double bond. The compound had the correct elemental analysis.

Following the same procedure, 16-dehydropregnenolone is converted to the 16(17)-diazomethane adduct of 16-dehydropregnenolone.

PREPARATION 2

6,16-dimethyl-16-dehydropregnenolone (III)

5.0 g. of the 16(17)-diazomethane adduct of 6-methyl - 16 - dehydropregnenolone was heated in an oil bath at 185–190° C. under nitrogen for one hour. The glassy product was dissolved in methylene chloride and poured onto a 250 g. column of magnesium silicate (Florisil) packed wet with hexanes (Skellysolve B). The column was developed with hexanes containing increasing amounts of acetone. 6,16-dimethyl-16-dehydropregnenolone was eluted with hexanes plus 8% acetone. Recrystallization of this product from ethyl acetate gave 1.4 g. of crystals thereof melting at 152–156° C., $[\alpha]_D$ —102° (CHCl$_3$), $$\lambda_{max.}^{EtOH}\ 252\ m\mu,\ a_M = 8,850$$

and having the correct elemental analysis.

Following the same procedure, the 16(17)-diazomethane adduct of 16-dehydropregnenolone is converted to 16-methyl-16-dehydropregnenolone.

PREPARATION 3

6,16β-dimethyl-16α,17α-epoxypregnenolone (IV)

To a solution of 1.0 g. of 6,16-dimethyl-16-dehydropregnenolone in 60 ml. of methanol was added 1.6 ml. of 5 N sodium hydroxide followed by 4 ml. of 30% hydrogen peroxide. The solution was refrigerated overnight and then maintained at room temperature for 7 hours. A water soluble precipitate was removed and the filtrate was concentrated in a rotary vacuum evaporator nearly to dryness. Water was added and the product collected on a filter, washed with water and dried to give 1.0 g. of 6,16β-dimethyl-16α,17α - epoxypregnenolone melting at 155–158° C. Recrystallization from aqueous methanol raised the melting point to 162–164° C., $[\alpha]_D$—17° (CHCl$_3$). The elemental analysis was correct.

Following the same procedure, 16-methyl-16-dehydropregnenolone is converted to 16β-methyl-16α,17α-epoxypregnenolone, melting at 189–193° C.

PREPARATION 4

16β-methyl-16α,17α-epoxyprogesterone (V)

A solution of 5.0 g. of 16β-methyl - 16α,17α - epoxypregnenolone in 15 ml. of cyclohexanone and 35 ml. of toluene was boiled a few minutes to remove any traces of water and then 2.5 g. of aluminum isopropoxide was added. The solution was stirred under reflux for 35 minutes, cooled, diluted with a little methylene chloride and then washed with dilute sodium hydroxide, salt water, dilute hydrochloric acid, and then twice with salt water. The solution was dried and then chromatographed on 200 g. of magnesium silicate (Florisil). The 16β-methyl-16α,17α-epoxyprogesterone was eluted with hexanes (Skellysolve B) plus 6–8% acetone and then recrystallized from a mixture of hexanes and acetone to give 2.9 g. of crystals thereof melting at 162–164° C., $[\alpha]_D$—152° (CHCl$_3$), $$\lambda_{max.}^{EtOH}\ 240\ m\mu,\ a_M = 17,400$$

An additional 0.65 g. of the same product melting at 154–161° C. was obtained from the mother liquor.

Following the same procedure, 6,16β-dimethyl-16α,17α-epoxypregnenolone is oxidized to 6α,16β-dimethyl-16α,17α-epoxyprogesterone.

PREPARATION 5

16-methylene-17α-hydroxypregnenolone (VI)

One g. of 16β-methyl-16α,17α-epoxypregnenolone was dissolved in about 5 ml. of methylene chloride and then diluted to 25 ml. with absolute ether. 0.5 ml. of 32% hydrogen bromide in acetic acid was added. A precipitate formed immediately. After 0.5 hour, the precipitate was separated, washed with ether, dried and recrystallized from methanol to give 0.5 g. of 16-methylene-17α-hydroxypregnenolone melting at 251–255° C., $[\alpha]_D$—164° (CHCl$_3$), and having the correct elemental analysis.

Following the same procedure 3β-hydroxy 6,16β-dimethyl-16α,17α-epoxy-5-pregnen-20-one is converted to 6-methyl-16-methylene-17α-hydroxypregnenolone.

EXAMPLE 1

16-methylene-17α-hydroxyprogesterone

To a solution of 2.0 g. of 16β-methyl-16-α,17α-epoxyprogesterone in 100 ml. of absolute ether was added dropwise 1.0 ml. of 32% hydrogen bromide in acetic acid. The solution was stored in the refrigerator for several hours. The crystals were collected, washed with ether, slurried with dilute aqueous sodium bicarbonate, washed with water and dried to give 1.9 g. of 16-methylene-17α-hydroxyprogesterone melting at 212–228° C. (dec.), $[\alpha]_D$—4° (CHCl$_3$), $$\lambda_{max.}^{EtOH}\ 241\ m\mu,\ a_M = 17,600$$

Nuclear magnetic resonance established the presence of the isolated exocyclic double bond.

Following the same procedure, 6α,16β-dimethyl-16α,17α-epoxyprogesterone is converted to 6α-methyl-16-methylene-17α-hydroxyprogesterone.

EXAMPLE 2

16-methylene-17α-hydroxyprogesterone 17-acetate

Nitrogen was bubbled through a solution of 1.95 g. of 16-methylene-17α-hydroxyprogesterone in 32 ml. of acetic acid and 8 ml. of acetic anhydride and 0.8 g. of p-toluenesulfonic acid was then added. The solution was stirred for 2 hours at room temperature and then poured into a mixture of ice and water. The thus-produced 16-methylene-17α-hydroxyprogesterone 3-enol acetate 17-acetate solidified upon the addition of a small amount of ether. The precipitate was separated, washed with water and dried. It was then dissolved in 20 ml. of warm methanol and 2 ml. of 10% sodium hydroxide was added. The solution was chilled almost immediately and the product flooded out with water. The precipitated product was chromatographed on acid washed alumina. Hexanes (Skellyslove B) plus 6–7% acetone eluted 0.6 g. of 16-methylene-17α-hydroxyprogesterone 17-acetate melting at 227–230° C., $[\alpha]_D$—52° (CHCl$_3$), $$\lambda_{max.}^{EtOH}\ 240\ m\mu,\ a_M = 17,550$$

Following the same procedure, 6α-methyl-16-methylene-17α-hydroxyprogesterone is converted to 6α-methyl-16-methylene-17α-hydroxyprogesterone 17-acetate.

Similarly, 16-methylene-17α-hydroxyprogesterone and 6α-methyl-16-methylene - 17α - hydroxyprogesterone are converted to other 17-acylates thereof by esterification of the 17-hydroxy group, e.g., by reaction with the appropriate acid anhydride or acid in the presence of an esterification catalyst, etc. Examples of 16-methylene-17α-hydroxyprogesterone 17-acylates and 6α-methyl-16-methylene-17α-hydroxyprogesterone 17-acylates prepared include those wherein the acyl group is the acyl radical of a hydrocarbon carboxylic acid, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylproyionic, an aryl or alkaryl acid, e.g., benzoic, methylbenzoic, dimethylbenzoic, ethylbenzoic, 2,4,6 - trimethybenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium, salts) e.g., succinic, glutaric, α-methylglutaric, β-methylglutaric, β,β-dimethylglutaric, adipic, pimelic, and suberic acid.

Example 3

*16-methylene-17α-hydroxy-1,4-pregnadiene-3,20-dione 17-acetate*

A mixture of 100 mg. of 16-methylene-17α-hydroxyprogesterone 17-acetate dissolved in 6 ml. of tertiary butyl alcohol and 0.55 ml. of acetic acid was heated together with 30 mg. of selenium dioxide to approximately 75° C. under stirring for about 24 hours. Thereafter, another 30 mg. portion of selenium dioxide was added and the mixture heated to 75° C. under continuous stirring for another 24 hours. The mixture was then cooled, filtered to remove the selenium dioxide and evaporated. The residue was dissolved in methylene chloride and washed with freshly prepared ammonium sulfide, ammonium hydroxide and water. After removal of the solvent the residue was recrystallized from a mixture of hexanes and acetone to give 16-methylene-17α-hydroxy-1,4-pregnadiene-3,20-dione 17-acetate. Further purification can be achieved by chromatography over magnesium silicate eluted with hexanes containing increasing proportions of acetone.

Following the procedure of Example 3, 6α-methyl-16-methylene-17α-hydroxyprogesterone 17-acetate, 6α-methyl-16-methylene-17α-hydroxyprogesterone, and 16-methylene-17α-hydroxyprogesterone are converted to 6α-methyl-16-methylene-17α-hydroxy-1,4-pregnadiene-3,20-dione 17-acetate, 6α-methyl-16-methylene-17α-hydroxy-1,4-pregnadiene-3,20-dione, and 16-methylene-17α-hydroxy-1,4-pregnadiene-3,20-dione, respectively. Other 17-acylate esters of the above-described starting 17-hydroxy compounds, e.g., wherein the acyl radical of the acylate group is that of an acid named in the paragraph following Example 2, are dehydrogenated to the corresponding 1-dehydro compounds.

Example 4

*16-methylene-17α-hydroxy-4,6-pregnadiene-3,20-dione 17-acetate*

400 mg. of 16-methylene-17α-hydroxyprogesterone 17-acetate, 600 mg. of recrystallized 2,3,5,6-tetrachloro-1,4-benzoquinone (chloranil) and 24 ml. of tertiary amyl alcohol was heated to boiling under nitrogen with a few boiling chips, and gently refluxed for 6 hours. The mixture was cooled and evaporated to dryness under reduced pressure. The solid residue (with exception of some chloranil, which is insoluble) was dissolved in about 100 ml. of ether and filtered. The chloranil on the filter paper was washed with several portions of ether and the combined ether filtrates were washed with two 200-ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue was crystallized from a mixture of hexanes and acetone to give 16-methylene-17α-hydroxy-4,6-pregnadiene-3,20-dione 17-acetate.

Following the procedure of Example 4,

6α-methyl-16-methylene-17α-hydroxyprogesterone 17-acetate,
6α-methyl-16-methylene-17α-hydroxyprogesterone, 16-methylene-17α-hydroxyprogesterone,
16-methylene-17α-hydroxy-1,4-pregnadiene-3,20-dione,
6α-methyl-16-methylene-17α-hydroxy-1,4-pregnadiene-3,20-dione,
6α-methyl-16-methylene-17α-hydroxy-1,4-pregnadiene-3,20-dione 17-acetate, and
16-methylene-17α-hydroxy-1,4-pregnadiene-3,20-dione 17-acetate are converted to 6-methyl-16-methylene-17α-hydroxy-4,6-pregnadiene-3,20-dione 17-acetate,
6-methyl-16-methylene-17α-hydroxy-4,6-pregnadiene-3,20-dione,
16-methylene-17α-hydroxy-4,6-pregnadiene-3,20-dione,
16-methylene-17α-hydroxy-1,4,6-pregnatriene-3,20-dione,
6-methyl-16-methylene-17α-hydroxy-1,4,6-pregnatriene-3,20-dione,
6-methyl-16-methylene-17α-hydroxy-1,4,6-pregnatriene-3,20-dione 17-acetate, and
16-methylene-17α-hydroxy-1,4,6-pregnatriene-3,20-dione 17-acetate, respectively. Other 17-acylate esters of the above-described starting 17-hydroxy compounds, e.g., wherein the acyl radical of the acylate group is that of an acid named in the paragraph following Example 2, are dehydrogenated to the corresponding 6-dehydro compounds.

Example 5

*6-methyl-16-methylene-17α-hydroxyprogesterone 17-acetate*

Following the procedure of Example 2, 6-methyl-16-methylene-17α-hydroxypregnenolone is convertedd to 6-methyl-16-methylene-17α-hydroxypregnenolone 3,17-diacetate. The compound is then selectively hydrolyzed with about 4 molar equivalents of concentrated hydrochloric acid in refluxing methanol for one hour, e.g., in the manner of the copending application of Babcock et al., S.N. 740,553, Preparation 1B, to produce 6-methyl-16-methylene-17α-hydroxypregnenolone 17-acetate. Oxidation of this compound according to the procedure of Preparation 4 gave 6α-methyl-16-methylene-17α-hydroxyprogesterone 17-acetate.

Similarly, 16-methylene-17α-hydroxypregnenolone is converted, via its 3,17-diacetate and its 17-mono acetate to 16-methylene-17α-hydroxyprogesterone 17-acetate.

Similarly, other 3,17-diacylates and 17-monoacylates of the above described compounds are prepared by substituting another acid anhydride, e.g., wherein the acyl radical is that of an acid named in the paragraph following Example 2, for the acetic anhydride employed in the final step.

*11β,17α-dihydroxy-16-methyleneprogesterone*

Five sterile Erlenmeyer flasks containing 100 ml. of a medium consisting of 1 g. commercial dextrose and 1.2 g. corn steep liquor solids adjusted to a pH of 5.0 were inoculated with spores from a malt extract agar culture of *Curvularia lunata*, American Type Culture Collection No. 12,017. After 72 hours these flasks were used to inoculate 10 liters of the same medium in a stirred and baffled fermenter. 10 ml. of sterile lard oil was used as an antifoaming agent. An air flow of 0.5 liter per minute was maintained for 48 hours with a fermenter temperature of 28° C. At this time the pH was 7.2. Two g. of 16-methylene-17α-hydroxyprogesterone dissolved in 30 ml. of dimethylformamide was then added to the fermenter. Fermentation was continued for another 48 hours and the contents of the fermenter was then filtered through gauze. The mycelial solids were washed with water which was then combined with the filtered beer. The steroids were recovered from the beer by extracting 4 times with a mixture of 3 parts of methylene chloride and 1 part of ethyl acetate. The partly crystalline extractives were triturated with a mixture of ether and ethyl acetate to give 0.55 g. of 11β,17α-dihydroxy-16-methyleneprogesterone. Recrystallization of this product, with activated charcoal treatment, from ethyl acetate gave crystals thereof melting at 206–213° C., $\lambda_{max.}^{EtOH}$ 241 mμ, $a_M = 16,150$ Recrystallization from ethyl acetate raised the melting point to 212–215° C., $[\alpha]_D$ −28° ($CHCl_3$).

*9α-fluoro-11β,17α-dihydroxy-16-methylene-4-pragnene-3,20-dione*

To a solution of 500 mg. of 11β,17α - dihydroxy - 16-methyleneprogesterone in pyridine, in an atmosphere of nitrogen, is added 225 mg. of N-bromoacetamide. After standing for five minutes at room temperature under nitrogen, the reaction solution is cooled to 10 to 15° C.

and sulfur dioxide gas is passed over the surface while the mixture is shaken until the solution gives no color with acidified starch-iodine paper. During the addition of sulfur dioxide gas the reaction mixture becomes warm. The temperature is kept under 30° C. by external cooling and by varying the rate of sulfur dioxide addition. After standing at room temperature for a period of 15 minutes, the reaction mixture is poured into ice water and the resulting precipitate extracted with ether. The ether extract is washed with 5% hydrochloric acid and water, and evaporated to dryness. This material is recrystallized from a mixture of acetone and hexanes to give 16-methylene-17α-hydroxy-4,9(11)-pregnadiene-3,20-dione.

To a solution of 300 mg. of 16-methylene-17α-hydroxy-4,9(11) - pregnadiene - 3,20 - dione in a 1:2 mixture of methylene chloride and tertiary butyl alcohol is added a solution of 1.0 ml. of 72% perchloric acid in water followed by a solution of 150 mg. of N-bromoacetamide in 2.5 ml. of tertiary butyl alcohol. After stirring the reaction mixture to homogeneity, a solution of 150 mg. of sodium sulfite in 10 ml. of water is added and the reaction mixture is concentrated to a small volume under reduced pressure at about 60° C. The concentrate is cooled in an ice bath while stirring and water is added. After stirring for several minutes, the crystalline product is isolated by filtration, the solid is washed with water and air-dried to give 9α - bromo - 11β,17α - dihydroxy - 16 - methylene - 4 - pregnene-3,20-dione.

Alternatively, if desired, the concentrate is cooled, diluted with water, extracted with methylene chloride, washed, dried and the methylene chloride solution chromatographed to give substantially pure 9α-bromo-11β,17α-dihydroxy-16-methylene-4-pregnene-3,20-dione.

To a solution of 400 mg. of 9α - bromo - 11β,17α - dihydroxy-16-methylene-4-pregnene-3,20-dione is acetone is added 400 mg. of potassium acetate and the resulting suspension is heated under reflux for a period of 18 hours. The mixture is then concentrated to a small volume on the steam bath and water is then added. The potassium acetate goes into solution and the steroidal product separates out. The precipitated steroid is separated by filtration and recrystallized from a mixture of acetone and hexanes to give 9β,11β-epoxy-16-methylene-17α-hydroxy-4-pregnene-3,20-dione.

To a solution of 250 mg. of 9β,11β-epoxy-16-methylene-17α-hydroxy-4-pregnene-3,20-dione in 5 ml. of methylene chloride is added about 1 ml. of a 48% solution of hydrogen fluoride. The two-phase mixture is stirred, then diluted with methylene chloride and carefully poured into water containing sodium bicarbonate. After shaking to neutralize the excess hydrogen fluoride, the methylene chloride is separated and the water phase is extracted with more methylene chloride. The combined methylene chloride solution is dried over anhydrous sodium sulfate, diluted with ether and chromatographed over a column of magnesium silicate. The column is eluted with hexanes containing increasing proportions of acetone to give 9α-fluoro - 11β,17β - dihydroxy - 16 - methylene - 4 - pregnene-3,20-dione.

Esterification of 16-methylene-17α-hydroxy-4,9(11)-pregnadiene-3,20-dione in the manner described in Example 3 produces 16-methylene-17α-hydroxy-4,9(11)-pregnadiene-3,20-dione 17-acetate which is converted in the subsequent steps described above to 9α-fluoro-11β, 17α - dihydroxy - 16 - methylene - 4 - pregnene - 3,20-dione 17-acetate.

Following the same procedure 6α-methyl-16-methylene-17α - hydroxyprogesterone 17 - acetate is converted to 6α-methyl - 9α - fluoro - 11β,17α - dihydroxy - 16 - methylene-progesterone 17-acetate.

We claim:
1. 16 - methylene - 17α - hydroxy - 1,4 - pregnadiene-3,20-dione 17-acetate.

2. Compounds represented by the formula:

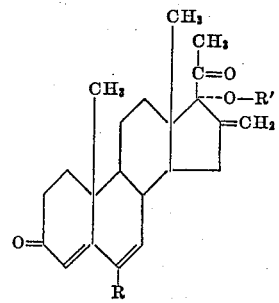

wherein R is selected from the group consisting of hydrogen and lower-alkyl and R' is selected from the group consisting of hydrogen and the acyl radical of a hydrocarbon carboxylic acid containing from 1 to 12 carbon atoms, inclusive.

3. 16 - methylene - 17α - hydroxy - 4,6 - pregnadiene-3,20-dione 17-acetate.

4. 6 - methyl - 16 - methylene - 17α - hydroxy - 4,6-pregnadiene-3,20-dione 17-acetate.

5. Compounds represented by the formula:

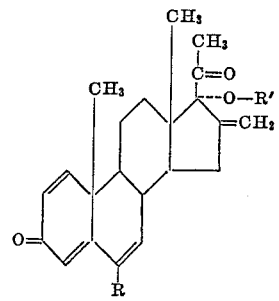

wherein R is selected from the group consisting of hydrogen and lower-alkyl and R' is selected from the group consisting of hydrogen and the acyl radical of a hydrocarbon carboxylic acid containing from 1 to 12 carbon atoms, inclusive.

6. 16 - methylene - 17α - hydroxy - 1,4,6 - pregnadiene-3,20-dione 17-acetate.

7. 6 - methyl - 16 - methylene - 17α - hydroxy - 1,4,6-pregnatriene-3,20-dione 17-acetate.

8. A compound of the formula:

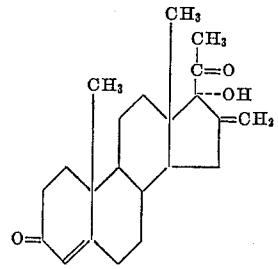

9. 17α - acyloxy - 6 - methyl - 16 - methylene - pregna-4,6-diene-3,20-diones having the general formula

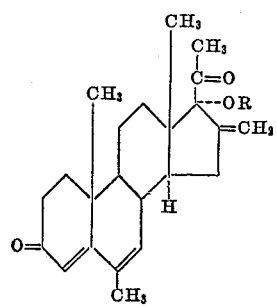

where R is an acyl group of a hydrocarbon carboxylic acid containing up to 6 carbon atoms.

10. A compound of the formula

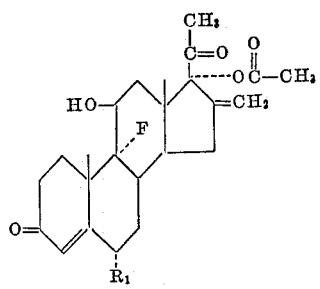

wherein $R_1$ is selected from hydrogen and methyl.

11. 16 - methylene - 4 - pregnene - 11α,17α - diol - 3,20-dione.

12. 16 - methylene - 4,9(11) - pregnadiene - 17α - ol-3,20-dione.

13. 9α - fluoro - 11β,17α - dihydroxy - 16 - methyleneprogesterone 17-acetate.

14. 6α - methyl - 9α - fluoro - 11β,17α - dihydroxy - 16-methyleneprogesterone 17-acetate.

15. A compound of the formula:

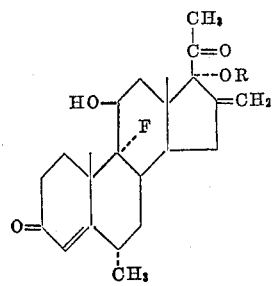

wherein R is selected from the group consisting of hydrogen and the acyl radical of a hydrocarbon carboxylic acid containing from 1 to 12 carbon atoms.

References Cited

UNITED STATES PATENTS 2,837,464  6/1958  Nobile _____ 260—397

E. L. ROBERTS, *Primary Examiner*.

J. FROME, L. GOTTS, L. H. GASTON, M. LIEBMAN, *Examiners.*